Figure 11:
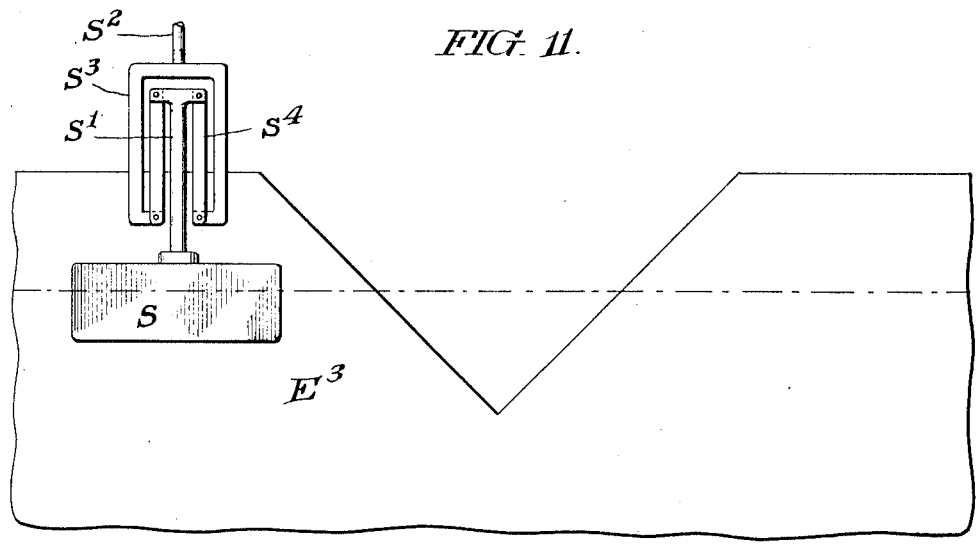

G. H. GIBSON.
LIQUID MEASURING APPARATUS.
APPLICATION FILED FEB. 1, 1911.
1,048,677.
Patented Dec. 31, 1912.
3 SHEETS—SHEET 1.
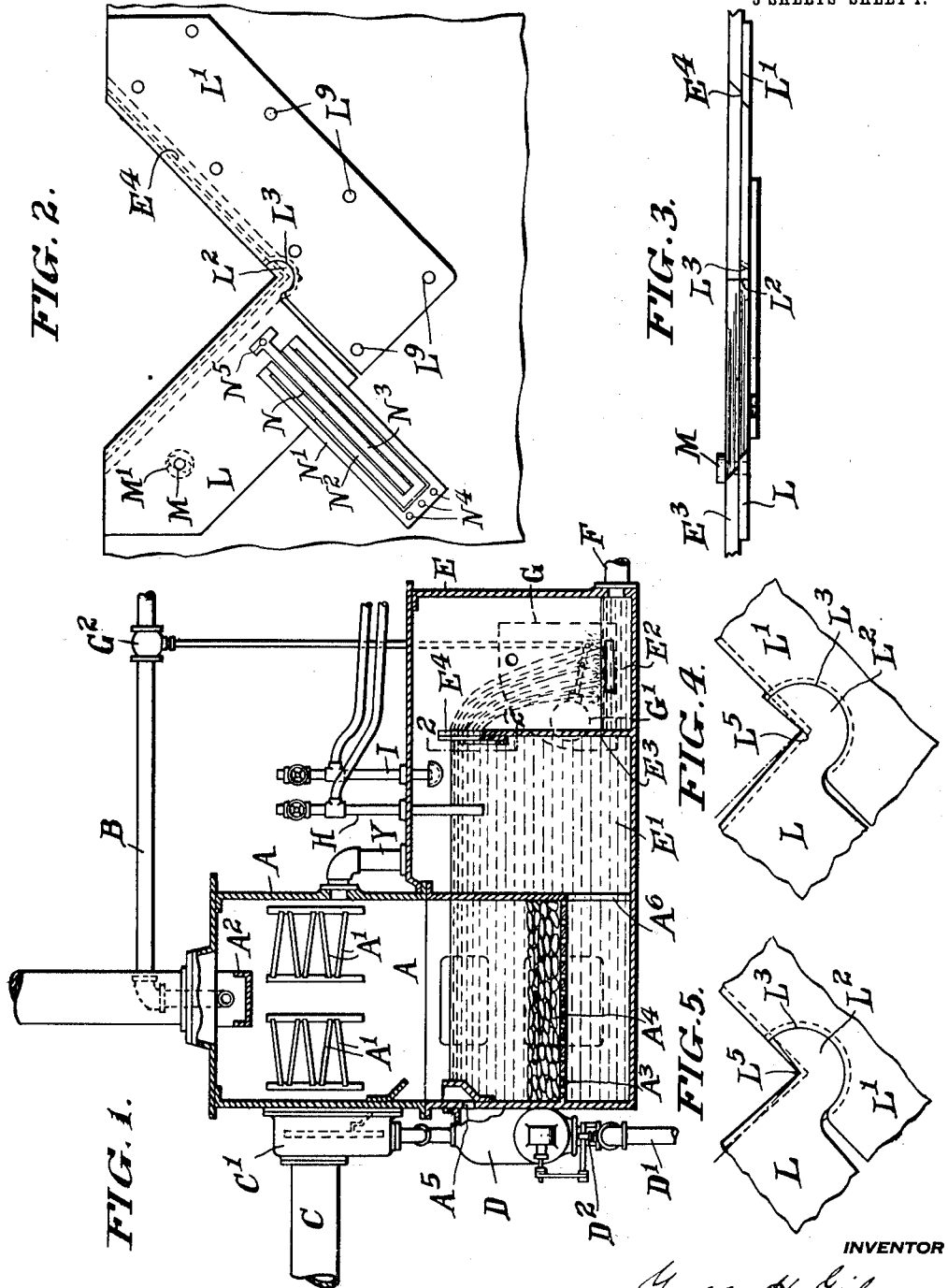
INVENTOR
George H. Gibson
WITNESSES
BY
ATTORNEY G. H. GIBSON.
LIQUID MEASURING APPARATUS.
APPLICATION FILED FEB. 1, 1911.
1,048,677.
Patented Dec. 31, 1912.
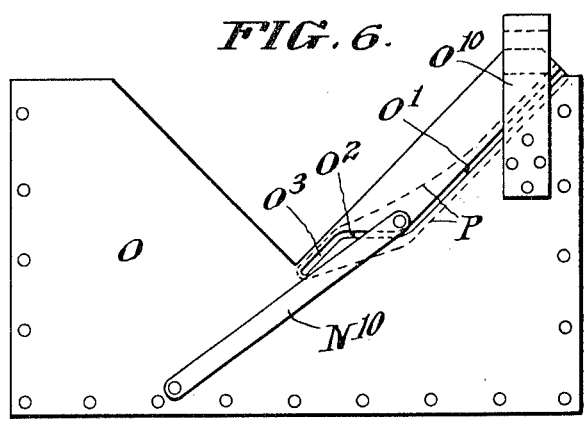
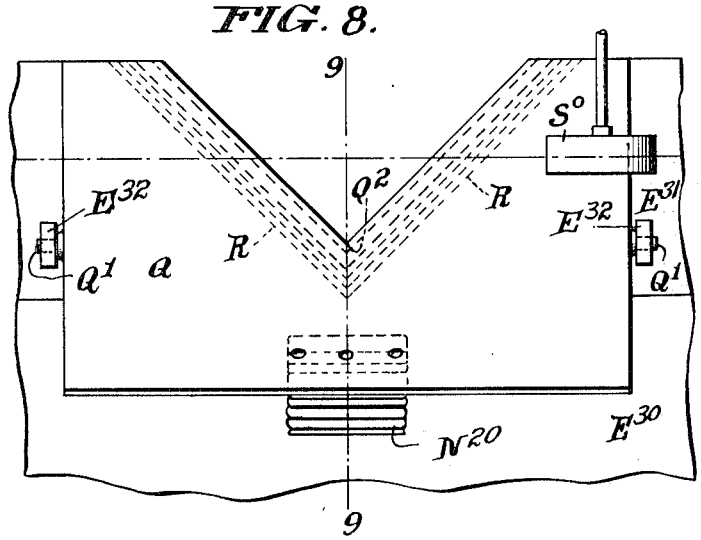
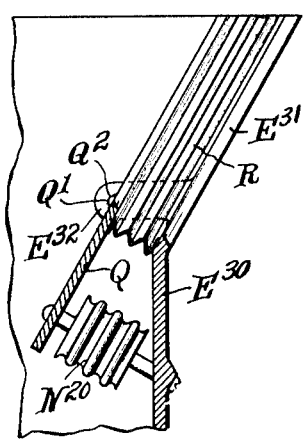
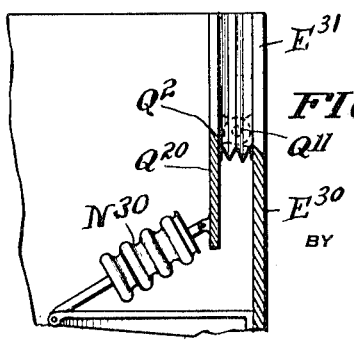

G. H. GIBSON.
LIQUID MEASURING APPARATUS.
APPLICATION FILED FEB. 1, 1911.

1,048,677.

Patented Dec. 31, 1912.
3 SHEETS—SHEET 3.

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, A FIRM.

LIQUID-MEASURING APPARATUS.

1,048,677.     Specification of Letters Patent.     Patented Dec. 31, 1912.

Application filed February 1, 1911. Serial No. 605,880.

*To all whom it may concern:*

Be it known that I, GEORGE H. GIBSON, a citizen of the United States of America, residing in Montclair, in the county of Essex and State of New Jersey, have invented a certain new and useful Improvement in Liquid-Measuring Apparatus, of which the following is a true and exact description, reference being had to the accompanying drawings, which form a part thereof.

My present invention relates to apparatus for measuring the rate of flow of a liquid over a weir, and particularly to apparatus in which the rate at which a liquid like water, of varying temperature flows through one or more V-shaped notches formed in the upper edge of a weir, is determined by measuring the variation in the amount of liquid accumulating on the supply side of the weir above the weir notch bottom level.

The object of my invention is to provide corrective or compensating provisions whereby the weight of the liquid flowing can be determined with the desired accuracy notwithstanding the changes in the density of the liquid which occur with changes in its temperature.

While the invention is of general utility, it is particularly useful, and the apparatus disclosed was primarily devised for use in measuring hot water varying in temperature over a substantial range by means of the apparatus forming the subject matter of my Patent No. 1,015,556, granted Jan. 23, 1912, and my copending application, Serial No. 605,878, filed February 1st, '11, wherein I have disclosed and claimed novel provisions adapted for measuring with a weir the hot water discharged from heaters of the kind commonly referred to as open feed water heaters. In my said patent and copending application I disclose means for measuring the variations in height above the bottom of the weir notch or notches, of the water level on the supply side of the weir, directly by means of a float, and indirectly by measuring the hydrostatic pressure at a determined level below the surface of the water on the supply side of the weir. With such apparatus the temperature of the water in practice not uncommonly varies from about 120° Fah. to 220° Fah. The variations in temperature of the water result in changes in its density, and the changes in density will, if not corrected or compensated for prevent the apparatus from truly measuring the weight of water flowing except when the water is at the temperature for which the apparatus is calibrated.

The character of the provisions necessary to correct or compensate for the changes in density of the liquid flowing depend to some extent upon the character of the measuring apparatus. The general laws governing the flow of liquids over weirs, and particularly the flow of water through V-shaped notches formed in weirs, have long been known. The most commonly used formula for the rate of flow of water through a right angled weir notch is:

$$V = 0.305 H^{5/2}$$

where V is the number of cubic feet per minute flowing through the notch and H is the height in inches of the water level on the supply side of the weir above the bottom of the notch. While the formula just given is sufficiently accurate for most purposes, the value of the constant .305 given above, varies slightly with variations in H, and the rate of flow varies also generally, but not exactly with the value of the tangent of half the angle of the weir notch. I have found with weirs and notches suitable for use in measuring the water discharged by an open feed water heater, where H ordinarily does not exceed ten or twelve inches and θ, the angle of the weir notch, is ordinarily about 90°, that a highly accurate and general formula for the rate of flow is:

$$V = 0.316 \tan\frac{\theta}{2} H^{2.473}.$$

Since W, the number of pounds of water flowing per minute equals 1728 VD, where D is the weight of a cubic inch of water, and since P, the hydrostatic pressure on the supply side of the weir at the lowermost level of flow over the weir in pounds per square inch, is given by the equation $P=HD$, the equation for the rate of flow given above may therefore be converted into either of the following equations:

$$W = 546.048 \tan.\frac{\theta}{2} DH^{2.473}$$

$$W = 546.048 \frac{\tan.\frac{\theta}{2}}{D^{1.473}} P^{2.473}$$

The first of the last two formulæ is one which I employ in determining the rate in pounds per minute of liquid flowing where I measure the accumulation of liquid on the supply side of the weir by measuring the height of the liquid level above the lowermost level of flow over the weir by means of a float or the like. The second of these equations is one which I employ when I measure the accumulation of liquid on the supply side of the weir by determining the hydrostatic pressure on that side of the weir at the lowermost level of overflow. With the first of these equations, it is apparent that in order to have the weight of liquid flowing constantly for any given value of H, the quantity $$D \tan.\frac{\theta}{2}$$

must remain constant; and with the other equation the quantity $$\frac{\tan.\frac{\theta}{2}}{D^{1.473}}$$

must remain constant if the weight of liquid flowing for any given value of P is to remain constant. This means in the first case, that as the temperature of the liquid increases and D, the density correspondingly decreases, the relation between W and H expressed by the formula may be preserved by increasing the angle $\Theta$ of the weir notch. Similarly in the second case, to preserve the relation between W and P, the angle $\Theta$ of the weir notch must decrease as the temperature of the water increases. I find that with either formula, I obtain results accurate enough for practical purposes and indeed approaching very closely to theoretical accuracy in the case of the ordinary temperature range of water issuing from an open feed water heater employing thermostatic mechanism to increase and decrease the weir notch angle as the temperature of the liquid increases or decreases where the flow is determined by measuring the height of liquid level, and to decrease and increase the weir notch angle as the temperature of the liquid increases and decreases where the rate of flow is determined by the hydrostatic method.

In addition to the above described methods of adjusting the apparatus to compensate for the variations in the relation between the rate of flow and the measurement thereof, which the change in density tends to introduce, it will be apparent that other methods of adjustment may be employed. For instance, if the weir be raised and lowered with respect to the measuring apparatus when theoretically the rate of flow should be decreased or increased to compensate for the change in density of the liquid flowing, increased accuracy may be obtained, and in practice, a very substantial approximation toward absolute accuracy may be obtained, when the rate of flow does not vary greatly from the average rate of flow, by raising and lowering the weir with relation to the measuring apparatus in direct or inverse proportion to the changes in temperature of the liquid flowing, depending on the character of the measuring apparatus.

Figure 12:
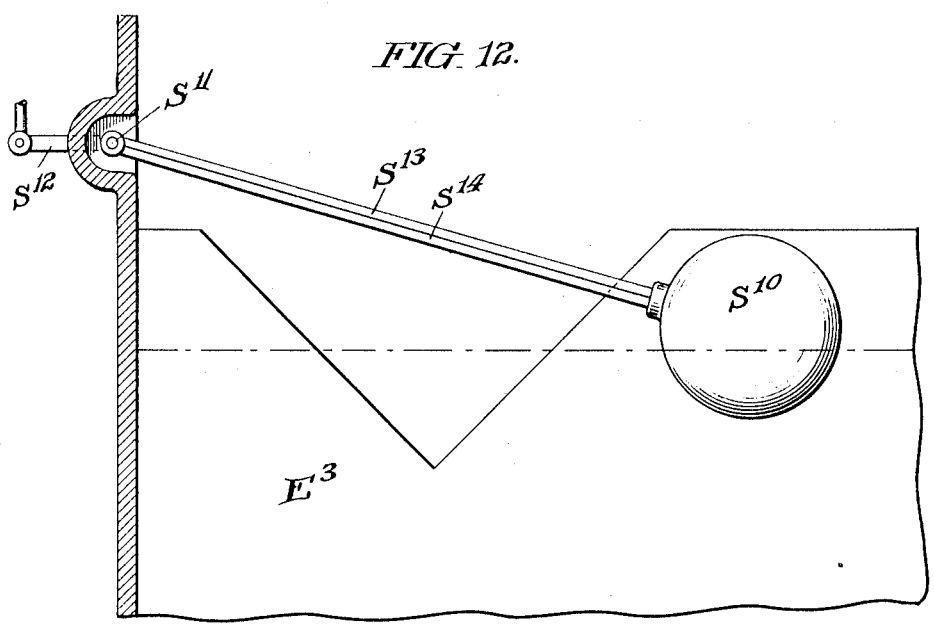

I have hereinafter described in detail, certain arrangements in which the apparatus is adjusted in the various ways referred to above, and have illustrated these arrangements in the accompanying drawings of which:

Figure 1 is an elevation partly in section, of water heating and measuring apparatus embodying the present invention. Fig. 2 is an elevation taken at right angles to Fig. 1, of a portion of the apparatus shown in the latter figure. Fig. 3 is a plan of the apparatus shown in Fig. 2. Fig. 4 is a partial elevation taken similarly to Fig. 2 but on a larger scale. Fig. 5 is a view taken similarly to Fig. 4, but showing the parts in different positions. Fig. 6 is an elevation of a weir plate and adjusting mechanism therefor, taken similarly to, but differing from the apparatus shown in Fig. 2. Fig. 7 is a plan view of the apparatus shown in Fig. 6. Fig. 8 is a view taken similarly to Fig. 2, but illustrating a third form of apparatus. Fig. 9 is a section on the line 9—9 of Fig. 8. Fig. 10 is a view taken similarly to Fig. 9 but showing a construction differing slightly from that of Figs. 8 and 9. Fig. 11 is a view taken similarly in general to Fig. 2, illustrating one arrangement for adjusting the measuring apparatus to compensate for changes in density of the liquid flowing. Fig. 12 is a view taken similarly to Fig. 11 showing a second method of adjusting the measuring apparatus.

Referring to the apparatus shown in Figs. 1 to 5, A represents the body portion or tank of an open feed water heater, which, in construction and arrangement, may be identical with the common form of this type of heater which has been well known and in common use for many years. In the form illustrated, A' represents the water spreading trays, A² the water distribution box, and A³ the perforated plate supporting coke or other suitable purifying and filtering material A⁴. A⁵ represents the overflow discharge orifice from the tank, and A⁶ the main discharge orifice through which the water heated in the heater is discharged. B represents the cold water supply pipe. C represents the pipe supplying steam for heating the water. C' is an oil separator of common form. D represents the overflow box into which the port A⁵ opens, and from which the oil and other impurities drain from the separator C'. D' is a waste pipe leading from the box D and controlled by a valve D² operated, as is usual, by a float (not shown) in the box D.

In the form shown in the drawings, the measuring box or weir receptacle E is secured to the side of and forms a part of a unitary structure with the heater tank A. The receptacle E is divided into two compartments E' and E² by the weir E³, which does not extend to the top of the receptacle and has one or more V-notches or orifices E⁴ formed in its upper edge, as shown best in Fig. 2. Y represents a steam pipe connection for equalizing the pressure in the steam space of the tank A and receptacle E. F represents the service discharge connection from the compartment E². The discharge port A⁶ of tank A opens directly into the lower end of the compartment E'. The supply of water to the tank A is controlled in response to the accumulation of water in the compartment E² by means of a valve G² in the water supply pipe B, the valve being opened and closed by a float G' in the float box G. The latter is in communication with the compartment E² and the valve G² is opened and closed as the water level in compartment E² falls below or rises to a predetermined height.

In so far as above described, the construction shown in Fig. 1 is essentially the same as that disclosed in my patent and copending application referred to above. With this apparatus the height of the water level in the compartment E' above the level of the apex of the weir notch E⁴ will vary in accordance with a known law with the variations in the rate of flow of water from the compartment E' into the compartment E².

In Fig. 1, I show provisions for measuring the accumulation of water on the supply side of the weir by the hydrostatic method. These provisions include tubes H and I connected to suitable pressure and measuring apparatus, as set forth in my patent and copending application above referred to.

In the construction shown in Figs. 1 to 5 inclusive, the weir notch proper is formed by two weir edge strips L and L' of suitable material such as brass, which are mounted on and overlap the margin of the notch E⁴ formed in the weir E³ proper. The plate L' is secured directly to the weir E³ proper as by rivets L⁹. The strip L' is formed with an undercut socket L³ concentric with the apex L⁵ of the weir notch, and in this socket is received the chamfered circular extension L² of the weir edge strip L. The latter fits snugly against the weir E³, the adjacent surfaces being carefully machined to restrict leakage, and in addition to being held in place by the pressure of the water on it, one or more rivets M (one being shown) may be secured to the strip L. The rivet M, as shown, passes through a slot M' in the weir E³ and has an enlarged head which bears against the discharge side of the weir E³. To automatically turn the weir edge strip about the apex, any suitable thermostatic mechanism may be employed. In the conventional form illustrated the thermostatic mechanism N comprises a U shaped member N' anchored at its bottom as by rivets N⁴ to the weir E³. To the ends of the legs of the member N' are secured the ends of the legs of a U-shaped member N² and to the bottom of the latter is secured one end of a rod N³. The upper end of the rod N³ is secured to the weir edge strip L as by the rivet N⁶.

The U-shaped member N² is formed of some material such as iron having a relatively small coefficient of expansion, and the members N' and N³ are formed of material such as zinc, having a relatively large coefficient of expansion. In consequence the edge strip L is turned about the apex L⁵ toward and away from the strip L' as the temperature of the water rises and falls, and by properly proportioning the parts the angle of the weir may thus be varied to the extent necessary to obtain a close approximation of the theoretical change in flow required to insure a rate of flow with a given hydrostatic pressure at the mouth of the tube H which does not vary with the temperature of the water.

As is clearly shown by Figs. 4 and 5, showing exaggerated adjustments of the movable weir edge plate, with the weir adjusting apparatus disclosed in Figs. 1 to 5, the angle of the portion of the notch formed wholly in the strip L is not varied by moving the strip, but, as this portion of the notch is small, and since in general, only a small fraction of the total flow takes place through it, the fact that this portion of the weir notch is not varied as the rest of the weir notch does not appreciably affect the accuracy of the results obtained with the apparatus.

In the construction shown in Figs. 6 and 7, O represents a plate adapted to be secured to the weir and having the weir notch proper formed in it. To permit the angle of the notch to be adjusted, I form in the plate O at one side of the weir notch a narrow slot which may in fact, be a saw kerf. This slot comprises a portion $O^3$ which approaches quite closely to the margin of the weir notch adjacent its apex, a portion $O'$, more remote from said margin and a connecting portion $O^2$. To prevent leakage from occurring through the slot $O'$, $O^2$ and $O^3$ I braze the edges of a trough-shaped body P of flexible sheet metal, such as copper, to the discharge side of the plate O at the margin of the slot. The thermostatic member $N^{10}$ is anchored at one end to the body of the plate O and at the other end to a portion of the plate O lying between the slot $O'$, $O^2$ $O^3$ and the weir notch. In consequence, the elongation and contraction of the member $N^{10}$, occurring as the temperature of the water flowing rises and falls, tends to narrow and widen the notch by bending the flexible portion of the plate between the notch and slot portion $O^3$. $O^{10}$ represents a slotted guide for the movable portion of the weir notch plate.

In the form of apparatus shown in Figs. 8 and 9 the weir proper comprises a vertical body portion $E^{30}$ and an inclined portion $E^{31}$. The weir notch member is in the form of a plate Q which extends generally parallel to the weir portion $E^{31}$ and is provided with trunnions $Q'$, the common axis of which is in the plane of the supply side of the plate Q and passes horizontally through the apex point $Q^2$ of the margin of the weir notch. The trunnions $Q'$ are journaled in bracket ears $E^{32}$ carried by the weir proper. $N^{20}$ represents a thermostatic member in the form of a bellows, containing an expansible liquid, which is connected between the lower edge of the plate Q and the portion $E^{30}$ of the weir. To prevent leakage, a bellows-folded expansible body R of flexible sheet metal is secured at the edge of the plate Q and its opposite edge to the weir portion $E^{31}$ at the margin of the weir notch. With this construction it will be apparent, that, as the bellows $N^{20}$ shortens and elongates, the plate Q will be oscillated about its pivotal axis to thereby correspondingly decrease and increase the effective angle of the weir notch as is desirable when the height of water level is directly measured as by the float $S^0$.

The apparatus shown in Fig. 10 differs from that shown in Figs. 8 and 9, in that the normal position of the upper portion of the weir and of the plate $Q^{20}$ is vertical. The plate $Q^{20}$ may be identical with the plate Q above described, except that the trunnions $Q^{11}$ carried at its opposite edges, are back of the rear side of the plate. In consequence on the small adjustment of the weir plate $Q^{20}$ produced by the thermostatic device $N^{30}$ the effective angle of the weir notch is not appreciably altered, but the elevation of the apex $Q^2$ of the weir notch is appreciably raised and lowered as the temperature of the water falls and rises. With this apparatus, as explained above, it is possible to compensate for the errors experienced from the changes in density of the water accompanying the change in its temperature, and where the rate of flow is fairly constant and does not vary greatly from the average rate of flow and average temperature, will give highly accurate results. As the thermostat is arranged in Fig. 10, the weir is lowered on an increase of temperature, as is desirable when the accumulation of water on the supply side of the weir is determined by measuring the height of water level on the supply side of the weir. The thermostat should, of course, be arranged as shown in Figs. 8 and 9, when the hydrostatic method of determining the accumulation of water on the supply side of the weir is employed.

In the arrangements shown in Fig. 11, the weir $E^3$ is intended to be stationary, and the float S is employed to determine the variation in water level on the supply side of the weir. In this form of apparatus I connect the rod $S^2$ by which the indicating, recording or registering apparatus is operated with the stem $S'$ of the float by connections $S^3$ and $S^4$, arranged to operate thermostatically to cause $S^2$ and S to separate as the temperature of the water decreases, and to approach as the temperature of the water increases. By employing a suitable thermostatic coupling, and it will be understood that the coupling illustrated is only conventional, I may obtain with this apparatus an adjustment in the relation between the rate of flow and the measurement thereof similar to that obtained in Fig. 1.

Results similar to those obtained with the apparatus shown in Figs. 10 and 11 may be obtained with the apparatus shown in Fig. 12. In the latter figure, the float $S^{10}$ is carried by an arm which is pivoted at $S^{11}$ and operates external indicating or recording mechanism through the arm $S^{a2}$, and is formed of strips $S^{13}$ and $S^{14}$ of dissimilar metals, so that the strip $S^{14}$ will expand and contract on changes in temperature to a greater extent than the strip $S^{13}$.

Those skilled in the art will understand that to obtain results of extreme accuracy it is essential in calibrating the apparatus, and in determining the amount of movement to be given to the thermally adjusted parts of the apparatus, to take account of the expansion and contraction of the weir itself, and in some cases of the weir chamber and of the measuring apparatus, where the accumulation of water is measured by a float, for theoretically perfect results, some account must be taken of the variations in the extent to which the float itself varies in submergence on changes in density of the liquid. In general it is desirable in calibrating the apparatus to so adjust it that the highest practicable accuracy is obtained at the average rate of flow and average temperature of the liquid flowing.

The means disclosed but not specifically claimed herein for adjusting the weir to decrease the flow occurring with a given height of liquid level on the supply side of the weir as the temperature of the liquid flowing increases, in conjunction with means for measuring the hydrostatic pressure at a predetermined level below the normal liquid surface level on the supply side of the weir, are specifically claimed in my said copending application, Serial No. 605,878, filed February 1st, 1911.

While in accordance with the provisions of the statute, I have illustrated and described above the best forms of my invention, now known to me, it will be apparent to those skilled in the art that changes may be made in the form of apparatus disclosed herein, while utilizing the gist of my invention, and that under certain circumstances certain features of my invention disclosed herein may advantageously be employed without a corresponding use of other features.

Having now described my invention what I desire to secure by Letters Patent, is:

1. Apparatus for measuring the flow of liquids, comprising in combination, a weir over which the liquid flows and means for measuring the accumulation of liquid on the supply side of the weir, said apparatus including thermostatic provisions for its adjustment to compensate for such changes in the relation between the weight of liquid flowing with a given accumulation of liquid on the supply side of the weir and the measurement made thereof as the changes in the density of the liquid resulting from its changes in temperature tend to make, substantially as described.

2. Apparatus for measuring the flow of liquids comprising in combination, a weir over which the liquid flows, means for measuring the accumulation of liquid on the supply side of the weir, and thermostatic means for adjusting the weir to compensate for the variation in the weight of liquid flowing with a given accumulation which the change in the density of the liquid consequent on its changes in its temperature tends to make.

3. Apparatus for measuring the flow of liquids, comprising in combination a notched weir over which the liquid flows, said weir being adjustable to vary the weir notch angle, means for measuring the accumulation of liquid on the supply side of the weir, and means for adjusting the weir and thereby vary the weir notch angle on variations in the temperature of the liquid flowing to compensate for changes in density of the liquid, resulting from said variations in its temperature.

4. Apparatus for measuring the flow of a liquid of varying temperature, comprising in combination a weir formed with a V-notch orifice having relatively adjustable sides, means for measuring the accumulation of liquid on the supply side of the weir and thermostatic mechanism for separating and drawing together the side edges of the weir notch as the temperature of the liquid flowing varies.

5. A notched weir adapted for use in liquid flow measuring apparatus having relatively adjustable notch margin portions and thermostatic mechanism for adjusting said portions.

6. Apparatus for measuring the flow of liquid, comprising a weir provided with a discharge notch and means for adjusting the weir to vary the cross-sectional shape of a discharge stream of any cross-sectional area passing through said notch.

GEO. H. GIBSON.

Witnesses:
  FRANK S. BROADHURST,
  WILBERT SAILER.